(12) United States Patent
Homrich (10) Patent No.: US 8,567,592 B2
(45) Date of Patent: Oct. 29, 2013

(54) ADJUSTABLE PART LOADER (75) Inventor: Paul R. Homrich, Maybee, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 392 days.

(21) Appl. No.: 12/966,275

(22) Filed: Dec. 13, 2010

(65) Prior Publication Data

US 2012/0148376 A1  Jun. 14, 2012

(51) Int. Cl.
B65G 15/20 (2006.01)
(52) U.S. Cl.
CPC .................................... B65G 15/20 (2013.01)
USPC ............................ 198/604; 198/607; 198/817
(58) Field of Classification Search
USPC .................. 198/586, 604, 607, 626.5, 817
See application file for complete search history.

(56) References Cited

U.S. PATENT DOCUMENTS

| 3,468,407 A | * | 9/1969 | Fürst | 198/443 |
| 3,831,807 A | * | 8/1974 | Deaton et al. | 221/85 |
| 4,099,609 A | * | 7/1978 | Kieronski et al. | 198/395 |
| 4,588,069 A | * | 5/1986 | Sticht | 198/443 |
| 5,186,600 A | * | 2/1993 | Wokeck et al. | 414/793.4 |
| 5,492,216 A | * | 2/1996 | McCoy et al. | 198/626.5 |
| 7,074,002 B2 | * | 7/2006 | Weeden et al. | 414/278 |
| 7,156,222 B2 | * | 1/2007 | Schnuelle et al. | 198/626.3 |
| 7,222,719 B2 | * | 5/2007 | Shackelford et al. | 198/459.2 |
| 7,909,159 B1 | * | 3/2011 | Zats et al. | 198/586 |

* cited by examiner

Primary Examiner — Mark A Deuble
(74) Attorney, Agent, or Firm — Carlson, Gaskey & Olds P.C.

(57) ABSTRACT

An example adjustable part loader system includes a first loader adjacent a base and adjustable along the base having a first motor and a second loader adjacent the base and adjustable along the base having a second motor. The second loader is aligned with the first loader along the base in a position relative to a dimension of a first part to be loaded. The first loader and the second loader each carry a distinct portion of the same part. The first loader is adjustable relative to the second loader. A controller system in communication with the first loader and the second loader and controls both simultaneously.

28 Claims, 6 Drawing Sheets

ADJUSTABLE PART LOADER

BACKGROUND

The invention relates to production machines, specifically an adjustable part loader for a production machine.

Production machines are used to assemble a variety of components to be used in different manufacturing fields. Parts to be assembled by the production machine must be loaded into the production machine. Parts may be loaded manually by a worker who loads each part individually into the production machine. This requires overhead lifting and increases in loading time.

Part loaders have been used to load the production machine with various parts needed to assemble a component.

SUMMARY OF THE INVENTION

An example adjustable part loader system includes a first loader adjacent a base and adjustable along the base having a first motor and a second loader adjacent the base and adjustable along the base having a second motor. The second loader is aligned with the first loader along the base in a position relative to a dimension of a first part to be loaded. The first loader and the second loader each carry a distinct portion of the same part. The first loader is adjustable relative to the second loader. A controller system in communication with the first loader and the second loader and controls both simultaneously.

An example production machine includes a machine and a base. A first loader and a second loader each have a motor and at least one clamp. Each clamp attaches the first loader and second loader to a portion of the base in a position relative to a dimension of a plurality of components to be loaded. The clamp includes a central portion between a first half and a second half, wherein the first half is substantially fixed and the second half is rotatable about the central portion to move between locked and unlocked positions. There is a controller in communication with the first loader and the second loader, wherein the first loader and the second loader receive signals from the controller.

An example method for loading parts into a production machine includes providing a first loader having a first motor and a second loader having a second motor are attached to the base. The first loader and second loader are spaced apart based on a dimension of a plurality of first parts to be loaded. A controller then signals both the first loader and the second loader to load the plurality of first parts. The first loader lifts a first portion of a part and a second loader lifts a second portion of the part in synchrony with said first portion.

These and other features of the present invention can be best understood from the following specification and drawings, the following of which is a brief description.

BRIEF DESCRIPTION OF THE DRAWINGS

FIG. 2 is a side view of a portion of an adjustable part loader as shown in FIG. 1a.

FIG. 3 is a perspective clamping system of an adjustable part loader as shown in FIG. 1a.

FIG. 4 is a top view of an adjustable part loader as shown in FIG. 1a.

DETAILED DESCRIPTION

Figure 1A:
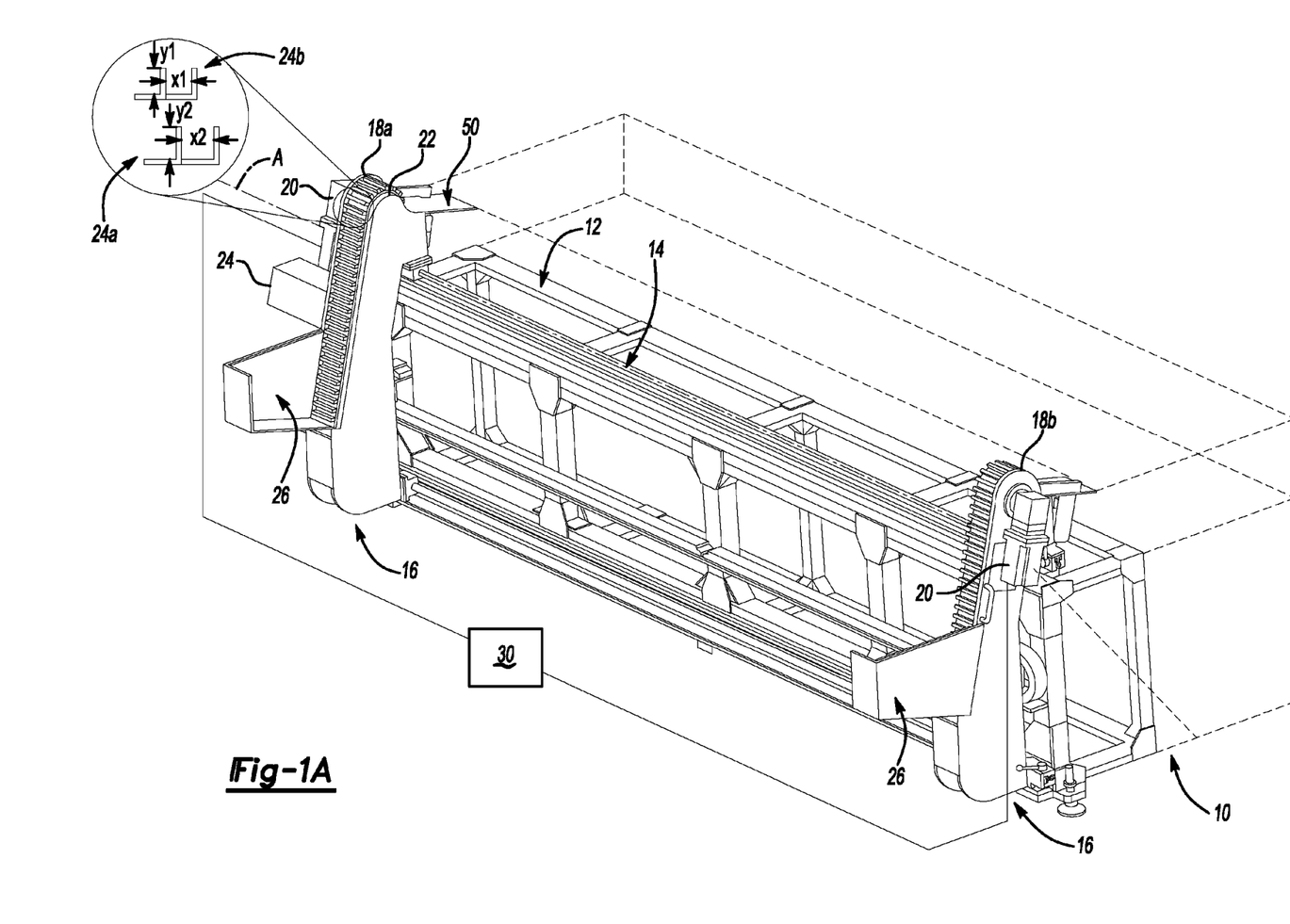
FIG. 1a is a perspective view of an adjustable part loader for use with a production machine.

Referring to FIG. 1a, a production machine 10 is adjacent to an adjustable part loader system 16, which includes a base 12 for use in loading parts onto the production machine 10. The base 12 includes a rail 14 which extends the length of the base 12. Although the base 12 is shown having a generally rectangular shape, it is within contemplation of this disclosure to use various configurations that are adaptable to have a rail 14 to fit on different production machines 10.

An adjustable part loader system 16 includes a first loader 18a and a second loader 18b. The loaders 18a, 18b are adjacent to and attached to the base 12. The first loader 18a and second loader 18b are axially aligned along the base 12 and are adjustably movable along the rail 14 as the loaders 18a, 18b run parallel along the rail 14. The first loader 18a has a motor 20 and the second loader 18b has a motor 20 independent of the first loader 18a. The motor 20 of each loader 18a, 18b is used to power each loader 18a, 18b. In one example, the motor 20 is a stepper motor or the like.

Each loader 18a, 18b has the same features positioned to work in sync as will be described further. Therefore, features will be described only on the first loader 18a, but are included features of the second loader 18b. The loader 18a includes a track 22 having a plurality of holders 24 such as a cleat or similar parts attached conventionally thereto. The holders 24 are spaced apart on the track 22 based upon the size of the part to be loaded. The track 22 with holders 24 can be removed and replaced with a track 22 with holders 24 of a different size when a different part of a different size is to be loaded. The motor 20 is used to move the track 22 in a closed loop about the loader 18a. The track 22 and holders 24 are used to take a part (see FIG. 4) from the hopper 26 and carry it on the track 22 to a platform 50, where it is dispensed onto the production machine (not shown). Each holder 24 of the first loader 18a will carry a portion such as an end of the part synchronously with the holder 24 of the second loader 18b. The holders 24 used to carry each end of a part are parallel aligned such that the part is carried on a level plane by the loaders 18a, 18b.

The first part loader 18a and/or second part loader 18b may slide along the base 12 to change the length therebetween to load different length parts while being attached to the base 12 at a distance apart relative to the part to be loaded. This distance can be adjusted during production to accommodate batches of a variety of parts of different lengths.

In one example, the adjustable part loader system 16 loads a plurality of parts having a first dimension. After the plurality of parts are loaded using track 22 with holder 24a having length x1 and height y1, each loader 18a, 18b uses a different track 22 with holder 24b having length x2 and height y2 dimensioned for use with a plurality of parts having a second dimension different than the first dimension, such as length or diameter. In this example, x2 is greater than x1 and y2 is greater than y1; however, other dimensions or configurations may be used. The adjustable part loader system 16 then loads the plurality of parts having the second dimension. In one example, the loader would load parts having a first size and a second size. Alternatively, the adjustable part loader system 16 can be moved to a different production machine 10 for use loading additional parts. This allows for the adjustable part loader 16 to accommodate and load parts of various diameters and lengths.

Both loaders 18a, 18b are in communication with a single control system 30. As will be described in further detail below in FIG. 5, the control system 30 communicates with both loaders 18a, 18b, specifically the motor 20 of each loader 18a, 18b to signal the loaders 18a, 18b to work in unison. Since the control system 30 is able to signal both motors 20 with the identical signals, the loaders 18a, 18b are adjustable, while still working in unison, regardless of the diameter and length of the parts loaded.

Figure 1B:
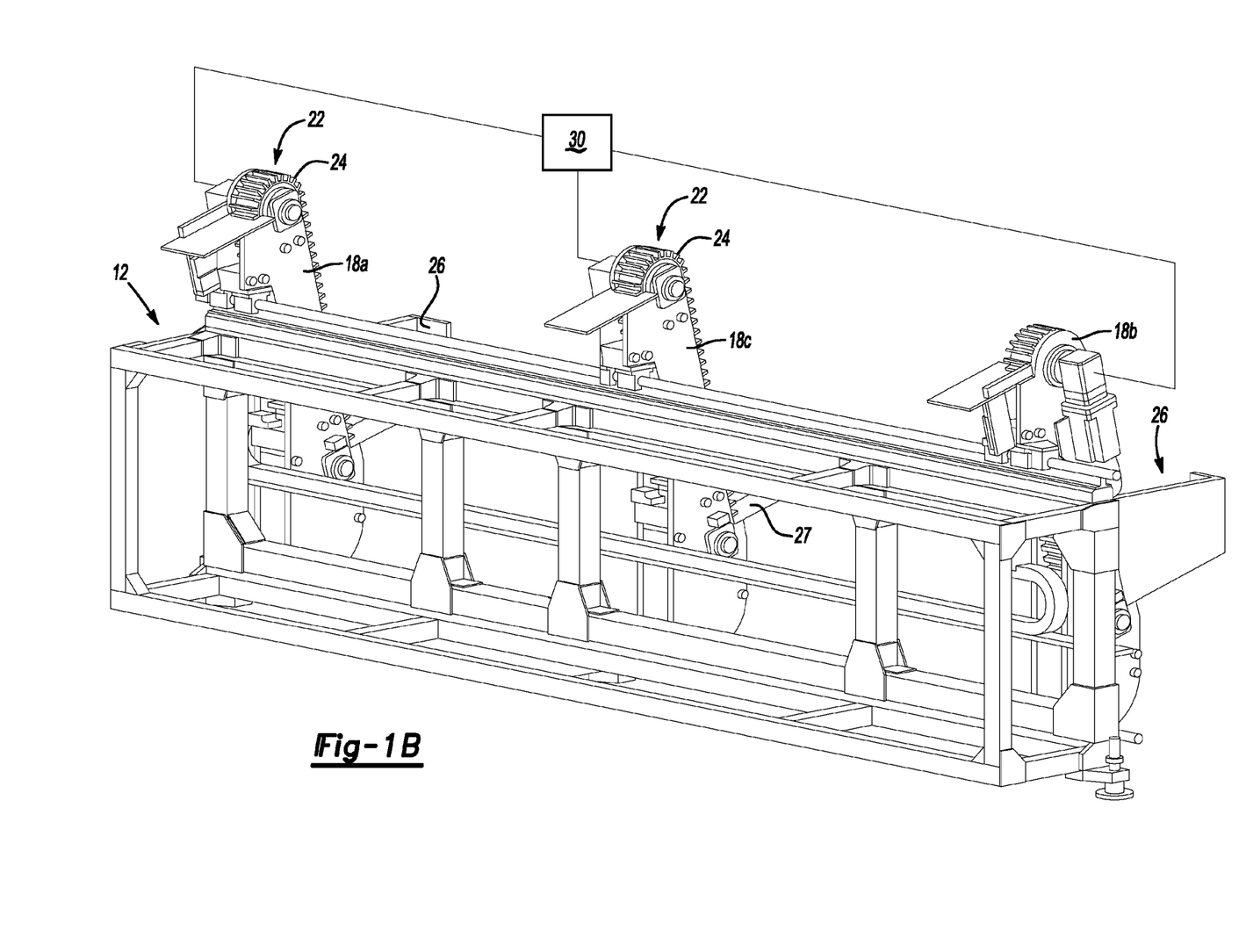
FIG. 1b is a side view of an alternate adjustable part loader for use with a production machine.

Referring to FIG. 1b, with continued reference to FIG. 1a, while two loaders 18a, 18b are described herein, a plurality of additional loaders 18c may be added to the rail 14 to load parts that might have dimensions needing more than two loaders 18a, 18b. In one example, a plurality of additional loaders 18c may be used to support the middle, or other portions, of a long or unwieldy part. Each of the plurality of additional loaders must maintain tracks 22 and holders 24 identical to the initial two loaders 18a, 18b. They must also be controlled by the same controller system 30 and have holders 24 aligned parallel with the holders of the initial two loaders 18a, 18b. Instead of having ends of a hopper 26 at the lower portion, as with loaders 18a, and 18b, the additional loaders 18c will have a support portion 27 configured to support a plurality of parts in the hopper 26 waiting to be loaded. The support portion 27 is aligned with the ends of the hopper 26, but does not have sidewalls. Thus the support portions 27 will form a part of the hopper 26 between the ends.

Figure 2:
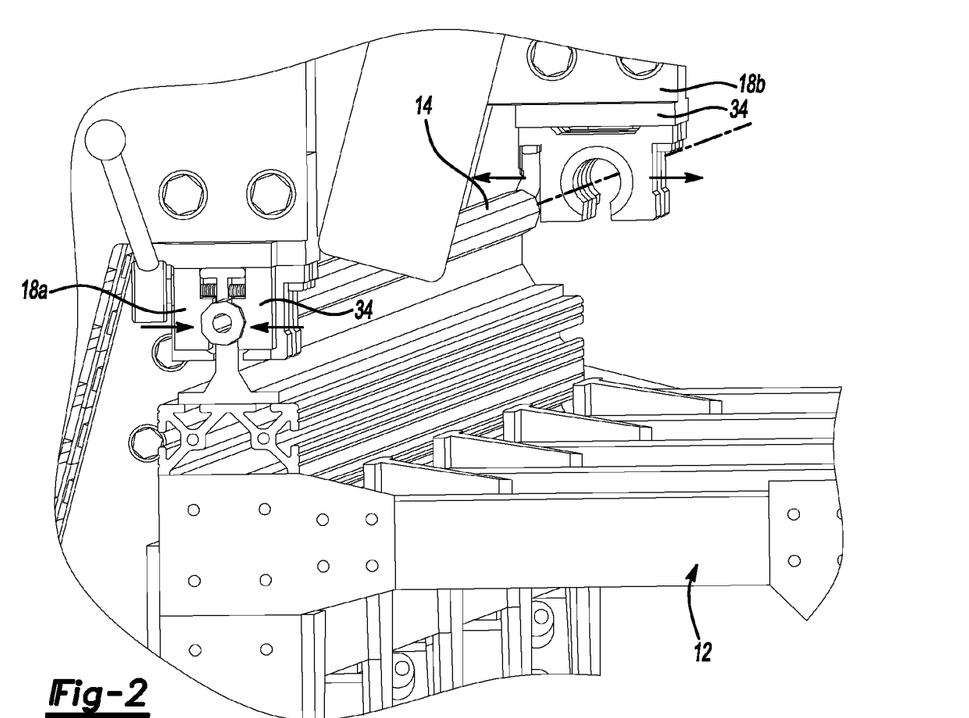

Referring to FIG. 2, the base 12 is shown including the rail 14 to which the loaders 18a and 18b are attached. Each loader 18a, 18b includes a clamp 34 (as will be discussed herein) which can be adjustably loosened or tightened as indicated by arrows around the rail 14 to position a loader 18a, 18b laterally on the rail. The clamp 34 is attached to the loader 18a, 18b by a bolt (shown in more detail in FIG. 3). The rail 14 is formed with the base 12 such that the rail 14 is mechanically attached to the base 12. Alternatively, the rail 14 can be attached to the base 12 by other known processes. Each clamp 34 attaches to the rail 14 of the base 12 and is then manually tightened to secure the loaders 18a, 18b in place at a distance relative to a part to be loaded. In one example, the rail 14 is a round-shaped cylinder. However, other types of generally cylindrical shaped rails 14 may be used.

Figure 3:
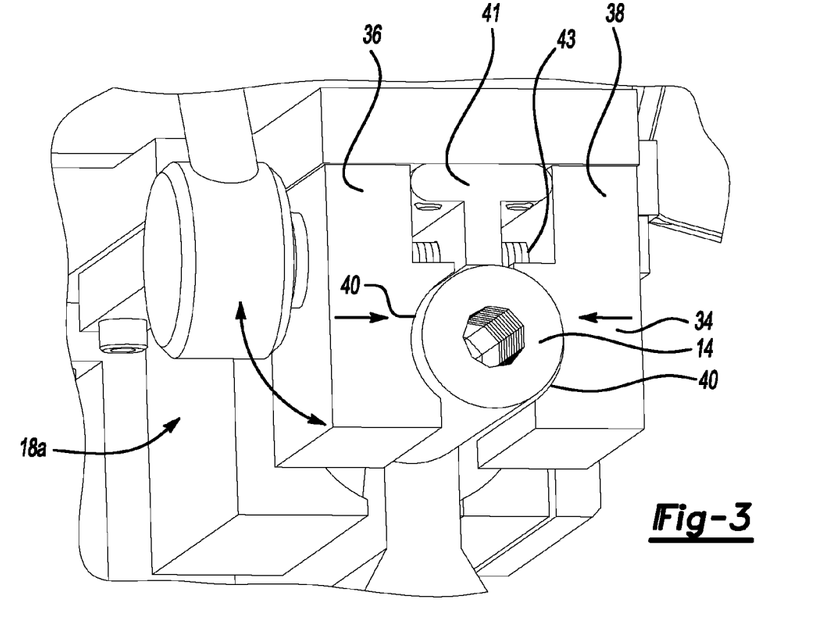

Referring to FIG. 3, with continued reference to FIGS. 1 and 2, an example clamp 34 is shown engaged around the rail 14. The clamp 34 includes a first half 36 and a second half 38. Both the first half 36 and second half 38 include an arc section 40. The arc section 40 of the first half 36 and second half 38 allow the clamp to close around the rail 14, regardless of the shape of the rail 14, to secure the loaders 18a,18b to the base 12. The arc section 40 allows the clamp to secure the loaders 18a, 18b to rails 14 of various dimensions and configurations.

The first half 36 is secured to a central portion 41 via a bolt 43. The second half 38 is loosely contiguous to the central portion 41 via the bolt 43, but is configured such that the clamp is loosened and tightened by having the second half 38 rotate relative to the central portion (as indicated by rotational arrows). In one example, the central portion 41 is T-shaped with the second half rotating around a horizontally extending end of the T-shaped central portion 41 and the bolt 43 passing through the vertically shaped end of the T shaped central portion 41. When the second half 38 is rotated into a closed position, as shown in FIG. 3, the clamp 34 engaged the rail 14 to set the loader 18a, 18b in place. The clamp 34 is located on the loader 18a, 18b such that the hopper 26 (FIG. 1) is positioned below the rail 14. This allows for efficient loading of parts onto the loaders 18a, 18b.

Figure 4:
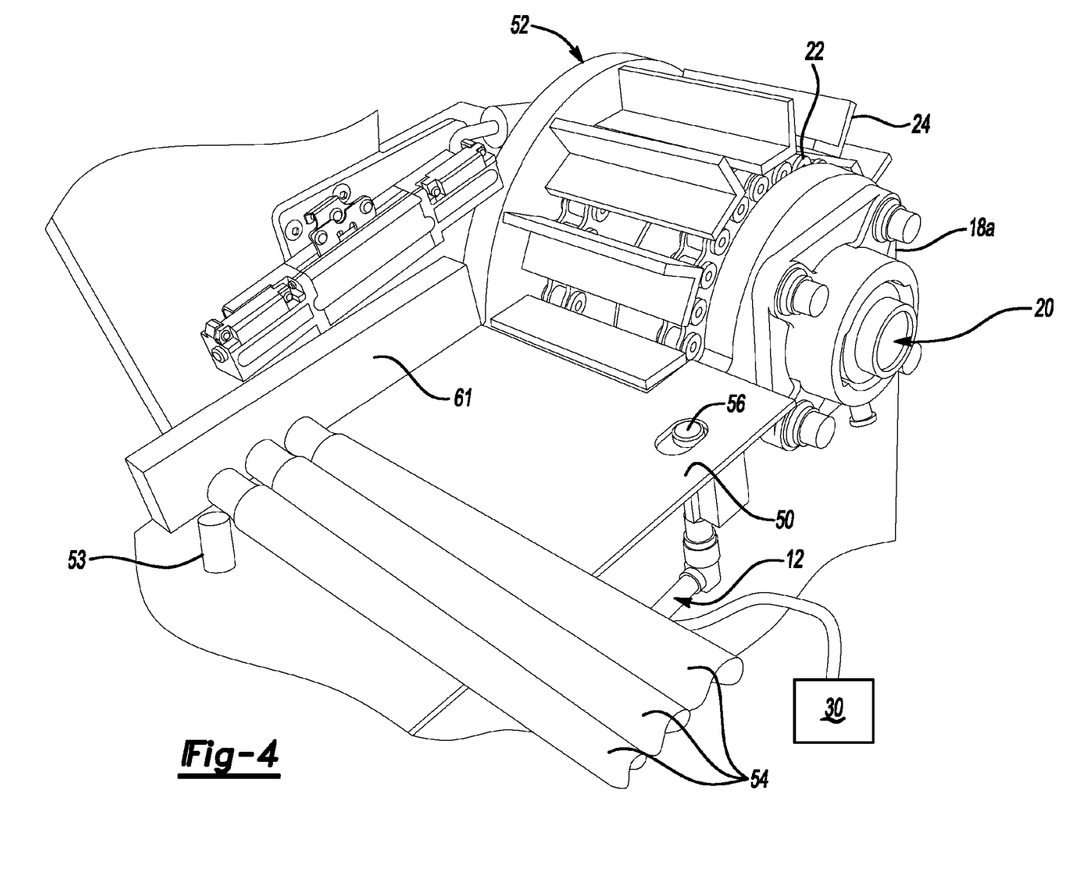

Referring to FIG. 4, with continued reference to FIGS. 1a and 1b, a platform 50, which is part of the base 12 is shown. As the track 22 with a plurality of holders 24 loops around a loader 18a, it will reach a peak 52 which is generally at the top end of the loader 18a. After passing the peak 52, each part, shown here as tubes 54, will drop from the loader 18a onto the platform 50. The loader 18a has a side rail 61 which keeps the plurality of parts 54 from leaving the platform. In one example, when more than two loaders 18a,18b are used, at least one additional loader 18c will not have a side rail 61.

The platform 50 further includes a sensor 56, which is in communication with the control system 30 and a solenoid 53, to meter the release of parts 54 onto the production machine 10. The solenoid 53 blocks the parts 54 from moving off the platform 50 until the sensor 56 is blocked. The sensor 56 is configured to sense the presence of a part 54 covering it on the platform 50. if parts 54 are present on the platform 50 and blocking the sensor 56, the sensor 56 is configured to send a signal to the control system 30 telling it to stop the motors 20 of each loader 18a, 18b so that too many parts are not provided to the platform 50 for use with the production machine 10 at one time. if the sensor 56 is unblocked, such as after a number of parts 54 are released to the production machine 10 by the solenoid 53, the sensor 56 is configured to send a signal to the control system 30 telling the control system 30 to signal the motors 20 of each loader 18a, 18b to activate and load more parts 54. The sensor 56 allows the adjustable loader system 16 to load parts 54 without providing too many parts 54, which would overload the production machine 10. Thus, the adjustable loader system 16 can run without supervision until the hopper 26 is empty.

Figure 5:
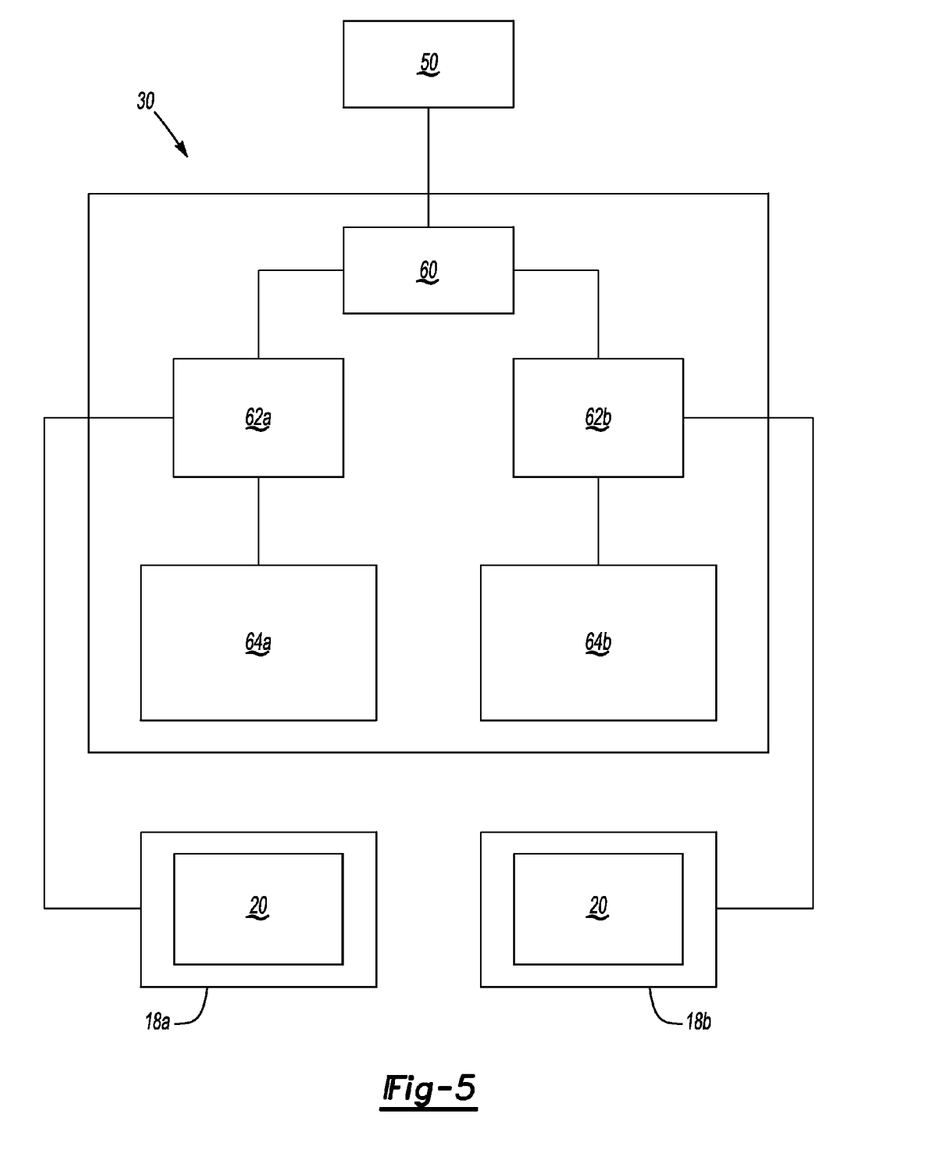
FIG. 5 is a schematic view of an example controller and drive for an adjustable part loader.

Referring to FIG. 5, with continued reference to FIGS. 1 and 4, the control system 30 is shown. The control system 30 includes a programmable controller 60, a first driver 62a, a second driver 62b, a first power supply 64a, and a second power supply 64b. As described above, a sensor 56 is in communication with the control system 30 specifically the programmable controller 60. The programmable controller 60 sends a synchronous pulse signal to the drivers 62a, 62b. The first driver 62a communicates with the motor 20 of the first loader 18a and the second driver 62b communicates with the motor 20 of the second loader 18b simultaneously so that the parts are kept level. The first driver 62a is powered by a first power supply 64a and the second driver 62b is powered by a second power supply 64b. The first driver 62a and second driver 62b send an electric pulse signal to the motor 20 of their respective loaders 18a, 18b. In one example, the power supply is an 80 volt DC battery. The use of a programmable controller 60 to control the first driver 62a and the second driver 62b allows for control of the first loader 18a and second loader 18b by a single programmable controller 60. The use of a single programmable controller 60 within a control system 30 to control the motors 20 of the first loader 18a and second loader 18b allow for the loaders 18a, 18b to be adjustable and in conjunction without a mechanical link between the loaders 18a, 18b.

In operation, each loader 18a, 18b of the adjustable loader system 16 is clamped to the base 12 base independent of the machine 10 so the loaders 18a, 18b can be moved from between multiple machines 10. The loaders 18a, 18b are clamped at a length necessary to load a part of a particular length. Holders 24 are used on each loaders 18a, 18b depending on the size of the parts to be loaded. A plurality of parts are loaded into the hopper 26. The control system 30 sends a signal to the motors 20 of each loader 18a, 18b instructing it to load the parts into the production machine 10 by dropping them on a platform 50, where they will be further used in the production machine 10.

Figure 6:
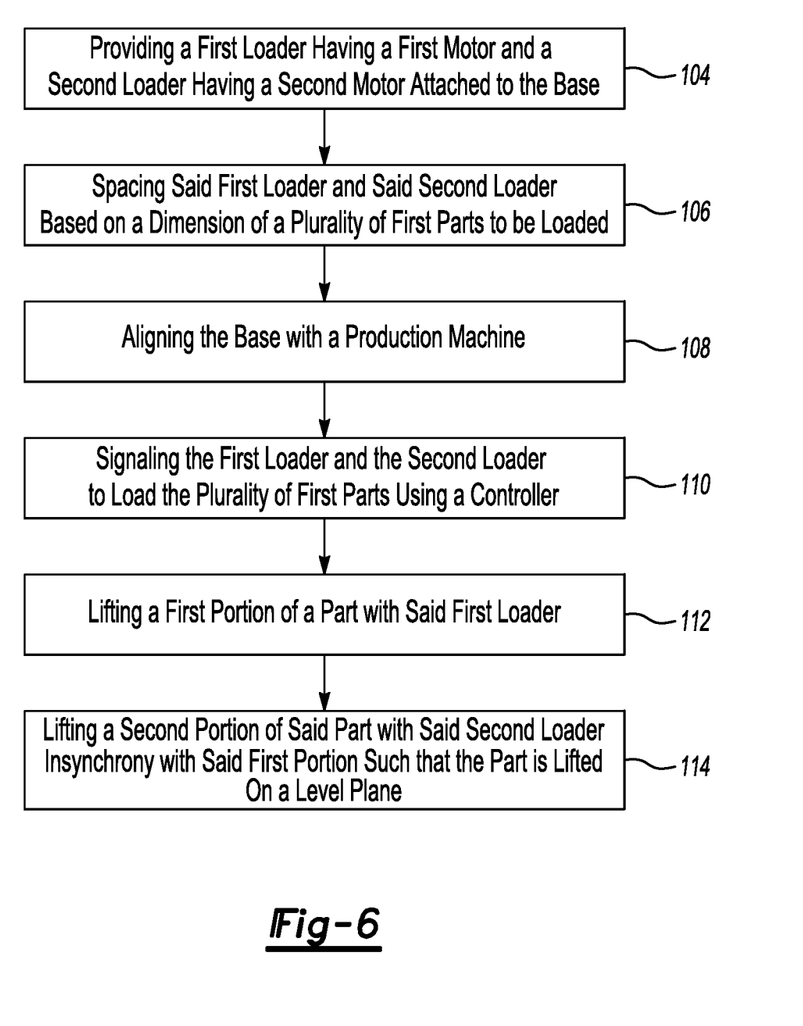
FIG. 6 shows a method of loading parts into a production machine.

Referring to FIG. 6, a method for loading parts into a production machine includes providing a first loader having a first motor and a second loader having a second motor attached to a base 104. The first loader and second loader are spaced apart based on a dimension of a plurality of first parts to be loaded 106. The base is aligned with the production machine 108. A controller then signals both the first loader and the second loader to load the plurality of first parts 110. The first loader lifts a first portion of a part 112 and a second loader lifts a second portion of the part in synchrony with said first portion 114.

Although a preferred embodiment of this disclosure has been disclosed, a worker of ordinary skill in this art would recognize that certain modifications would come within the scope of this disclosure. For that reason, the following claims should be studied to determine the true scope and content of this disclosure.

What is claimed is:

1. An adjustable part loader system comprising:
    a first loader adjacent a base and adjustable along the base, the first loader having a first motor;
    a second loader adjacent the base and adjustable along the base, the second loader having a second motor, wherein the second loader is aligned with the first loader along the base in a position relative to a dimension of a first part to be loaded, wherein the first loader and the second loader each carry a distinct portion of the same part and the first loader is adjustable relative to the second loader;
    a rail connected to each of said first loader and said second loader, wherein said first loader and said second loader are adjustable along said rail; and
    a controller system in communication with the first loader and the second loader, wherein the first loader and second loader are both controlled simultaneously by the controller system.

2. The adjustable part loader of claim 1, wherein the first loader and the second loader each have a clamp to attach to the base.

3. The adjustable part loader of claim 2, wherein the clamp includes a first side and a second side defining a generally circular clamping portion.

4. The adjustable part loader of claim 1, wherein the controller system comprises a programmable controller that communicates with the first loader and the second loader through a first driver and a second driver configured to provide a signal to the first loader and the second loader.

5. The adjustable part loader of claim 4, wherein the first driver sends a first signal to the motor of the first loader and the second driver sends a second signal to the motor of the second loader, wherein the first signal and the second signal are the identical.

6. The adjustable part loader of claim 1, wherein the first loader and the second loader include a plurality of holders.

7. The adjustable part loader of claim 6, wherein the holders are a first length apart and are interchangeable with second holders at a different, second length apart.

8. The adjustable part loader of claim 6, wherein the holders are cleats.

9. The adjustable part loader of claim 6, wherein the holders are spaced apart along a track based upon the component to be loaded.

10. The adjustable part loader of claim 1, wherein the first loader and the second loader can be adjusted relative to each other based upon a dimension of a second part to be loaded.

11. The adjustable part loader of claim 1, wherein a hopper is attached to the first loader and the second loader, the hopper having plurality of first components to be loaded.

12. The adjustable part loader of claim 1, wherein the motors are stepper motors.

13. The adjustable part loader of claim 1, wherein the first loader and the second loader are not mechanically attached to each other.

14. The adjustable part loader of claim 1, wherein the first loader and the second loader move a plurality of components to a platform having a sensor and a release device, wherein the release device releases a component from the adjustable part loader in response to the sensor being blocked.

15. The adjustable part loader of claim 14, wherein the sensor communicates with the control system, wherein the control system signals each motor to activate or deactivate in response to a signal from the sensor.

16. The adjustable part loader of claim 14, wherein at least one loader does not have a side rail forming an end of a platform.

17. The adjustable part loader of claim 2, wherein the rail is a component of the base and wherein each of the clamps connects to the rail.

18. A production machine comprising:
    a machine;
    a base;
    a first loader and a second loader each having a motor and at least one clamp, wherein each clamp attaches the first loader and second loader to a portion of the base in a position relative to a dimension of a plurality of components to be loaded, wherein the clamp includes a central portion between a first half and a second half, wherein the first half is substantially fixed and the second half is rotatable about the central portion to move between locked and unlocked positions; and
    a controller in communication with the first loader and the second loader, wherein the first loader and the second loader receive signals from the controller.

19. The production machine of claim 18, wherein the central portion is T-shaped.

20. The production machine of claim 18, wherein the production machine further includes a loading tray having a plurality of sensors, the first loader and the second loader moving the plurality of components onto the loading tray.

21. The production machine of claim 20, wherein the plurality of sensors signal when another component should be moved to the tray.

22. The production machine of claim 21, wherein the first loader and the second loader load the plurality of components in response to the signal of the plurality of sensors.

23. A method of loading parts into a production machine comprising:
    providing a first loader having a first motor and a second loader having a second motor attached to a base;
    adjusting a position of said first loader and said second loader along a rail of said base, such that the position of said first loader relative to said second loader is based on a dimension of a plurality of parts to be loaded;
    aligning the base with a production machine;
    signaling the first loader and the second loader to load the plurality of first parts using a controller;
    lifting a first portion of a part with said first loader; and
    lifting a second portion of said part with said second loader in synchrony with said first portion such that the part is lifted on a level plane.

24. The method of claim 23, further including loading all of a plurality of first parts.

25. The method of claim 24, further including the step of spacing the first loader and the second loader based upon a dimension of a plurality of second parts, wherein the dimension of the plurality of second parts is different than the dimension of the plurality of first parts.

26. The method of claim 23, further including the step of loading a plurality of second parts after the plurality of first parts have been loaded.

27. The method of claim 23, further including the step of providing a hopper with a plurality of first parts, the hopper configured to provide the plurality of first parts to the first loader and the second loader.

28. The adjustable part loader of claim 1, wherein said rail is a component of said base, and wherein each of said first loader and said second loader slide along said rail.

* * * * *